United States Patent
Yamamoto (10) Patent No.: US 9,913,009 B2
(45) Date of Patent: Mar. 6, 2018

(54) TRANSMITTER, RECEIVER, TRANSMISSION METHOD, AND RECEIVING METHOD

(71) Applicant: SONY CORPORATION, Tokyo (JP)

(72) Inventor: Masanari Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/022,658

(22) PCT Filed: Aug. 12, 2014

(86) PCT No.: PCT/JP2014/071341
§ 371 (c)(1),
(2) Date: Mar. 17, 2016

(87) PCT Pub. No.: WO2015/052990
PCT Pub. Date: Apr. 16, 2015

(65) Prior Publication Data
US 2016/0234579 A1 Aug. 11, 2016

(30) Foreign Application Priority Data
Oct. 10, 2013 (JP) .................... 2013-212836

(51) Int. Cl.
*H04J 14/00* (2006.01)
*H04Q 11/00* (2006.01)
*H04L 1/22* (2006.01)

(52) U.S. Cl.
CPC ........... *H04Q 11/0062* (2013.01); *H04L 1/22* (2013.01); *H04Q 2011/0084* (2013.01)

(58) Field of Classification Search
CPC . H04L 1/20; H04L 1/00; H04L 45/00; H04W 52/242; H04W 52/243; H04W 52/281; H04B 7/0632
USPC .......................................................... 398/45
See application file for complete search history.

(56) References Cited

U.S. PATENT DOCUMENTS

2012/0093212 A1* 4/2012 Oh .................. G09G 5/006 375/224
2013/0215741 A1* 8/2013 Nakajima ............. H04L 1/0003 370/230

FOREIGN PATENT DOCUMENTS

JP 2003-229798 A 8/2003
JP 2010-183196 A 8/2010

OTHER PUBLICATIONS

Hitachi. English translation of JP 2003-0229798, Aug. 15, 2003. 21 pages.*

* cited by examiner

*Primary Examiner* — Don N Vo
(74) *Attorney, Agent, or Firm* — Chip Law Group

(57) ABSTRACT

[Object] To propose a transmitter, a receiver, a transmission method, and a receiving method through which it is possible to implement good data transmission even under conditions in which connection failure may occur in a part of transmission paths.
[Solution] A transmitter includes a transmission processing unit configured to associate each of a plurality of pieces of data with any transmission path among a plurality of transmission paths and cause a transmission unit to transmit the data to an external device through the transmission path, a transmission quality information acquisition unit configured to acquire transmission quality information indicating transmission quality of each of the plurality of transmission paths, and a switch configured to switch a connection relation between the transmission processing unit and the plurality of transmission paths based on order information indicating a weight among the plurality of pieces of data and the acquired transmission quality information.

18 Claims, 4 Drawing Sheets

TRANSMITTER, RECEIVER, TRANSMISSION METHOD, AND RECEIVING METHOD

TECHNICAL FIELD

The present disclosure relates to a transmitter, a receiver, a transmission method, and a receiving method.

BACKGROUND ART

In recent years, along with high-definition images and the like, capacities of data to be transmitted between electronic devices have been significantly increasing, and communication methods in which large-capacity and high-speed data communication is possible are necessary. Wired optical communication using optical fibers is exemplified as a communication method in which such large-capacity and high-speed data communication can be implemented, and has already been commercialized in backbone system communication networks.

As wired optical communication using optical fibers described above, in high frequency communication in which large-capacity and high-speed data communication is possible, compared to low-speed communication methods, an influence on communication quality due to connection failure is large. Therefore, in wired optical communication in which large-capacity and high-speed data communication is possible, it is necessary to connect all optical fibers included in communication cables reliably without errors.

CITATION LIST

Patent Literature

Patent Literature 1 JP 2010-183196A

SUMMARY OF INVENTION

Technical Problem

On the other hand, even in consumer devices, capacities of data to be transmitted between, electronic devices have been increasing, and thus it is necessary to implement large-capacity and high-speed data communication using wired optical communication.

However, in consumer devices, since a general user performs a connection operation between an electronic device and a communication cable, it is difficult to prevent connection failure 100% due to adhesion of dirt and dust to optical communication terminal end surfaces, mechanical stress or the like.

Accordingly, the present disclosure proposes a transmitter, a receiver, a transmission method, and a receiving method which are novel and improved and through which it is possible to implement good data transmission even under conditions in which connection failure may occur in a part of transmission paths.

Solution to Problem

According to the present disclosure, there is provided a transmitter including: a transmission processing unit configured to associate each of a plurality of pieces of data with any transmission path among a plurality of transmission paths and cause a transmission unit to transmit the data to an external device through the transmission path; a transmission quality information acquisition unit configured to acquire transmission quality information indicating transmission quality of each of the plurality of transmission paths; and a switch configured to switch a connection relation between the transmission processing unit and the plurality of transmission paths based on order information indicating a weight among the plurality of pieces of data and the acquired transmission quality information.

According to the present disclosure, there is provided a receiver including: a reception processing unit configured to receive a plurality of pieces of data from an external device through a plurality of transmission paths; a transmission quality determination unit configured to determine transmission quality of the transmission path based on the data received through the transmission path for each of the plurality of transmission paths; and a notification unit configured to notify the external device of a determination result of the transmission quality of each of the plurality of transmission paths in order for the external device to associate the plurality of pieces of data with the plurality of transmission paths.

According to the present disclosure, there is provided a transmission method including: causing a processor to associate each of a plurality of pieces of data with any transmission path among a plurality of transmission paths, and causing a transmission unit to transmit the data to an external device through the transmission path, acquiring transmission quality information indicating transmission quality of each of the plurality of transmission paths, and causing a switch to switch a connection relation between the processor and the plurality of transmission paths based on order information indicating a weight among the plurality of pieces of data and the acquired transmission quality information.

According to the present disclosure, there is provided a receiving method including: receiving a plurality of pieces of data from an external device through a plurality of transmission paths; causing a processor to determine transmission quality of the transmission path based on the data received through the transmission path for each of the plurality of transmission paths; and notifying the external device of a determination result of the transmission quality of each of the plurality of transmission paths in order for the external device to associate the plurality of pieces of data with the plurality of transmission paths.

Advantageous Effects of Invention

According to the present disclosure described above, there are provided a transmitter, a receiver, a transmission method, and a receiving method through which it is possible to implement good data transmission even under conditions in which connection failure may occur in a past of transmission paths.

Note that the effects described above are not necessarily limited, and along with or instead of the effects, any effect that is desired to be introduced in the present specification or other effects that can be expected from the present specification may be exhibited.

DESCRIPTION OF EMBODIMENTS

Exemplary embodiments of the present disclosure will be described hi detail below with reference to the accompanying drawings. Note that, in this specification and the drawings, components that have substantially the same function and structure are denoted with the same reference numerals and repeated explanation thereof is omitted.

Descriptions will proceed in the following order.
1. Overview of communication system
2. Configuration of communication system
2.1. Basic configuration
2.2. Configuration of transmitting side
2.3. Configuration of receiving side
3. Operation of communication system
3.1. Operation of transmitting side
3.2. Operation of receiving side
3. Modification of communication system
4. Summary <1. Overview of Communication System>

First, an object of a communication system 1 according to an embodiment of the present disclosure will be clarified, and then an overview of the communication system 1 will be described. The communication system 1 according to the present embodiment connects a plurality of different electronic devices through a plurality of transmission paths, and transmits and receives a plurality of pieces of data through the plurality of transmission paths. In the communication system 1, a wired cable such as a copper wire or an optical fiber is used as the transmission path.

In particular, the communication system 1 according to the present embodiment includes the plurality of electronic devices (for example, electronic devices A and B) each including a transmission unit 100. When a general user connects a communication cable to the transmission unit 100, the plurality of electronic devices are connected to each other. In this manner, the communication system 1 according to the present embodiment is provided to implement large-capacity and high-speed data communication using a transmission path through which high frequency communication can be implemented such as the optical fiber, even when a general user performs a connection operation between the electronic device and the communication cable such as a consumer device.

On the other hand, in high frequency communication through which large-capacity and high-speed data communication is possible such as wired optical communication using the optical fiber, an influence on communication quality due to connection failure is large, compared to a low-speed communication method. Specifically, in communication between the electronic devices, when an error occurs in data propagated between the electronic devices with a decrease in communication quality, an electronic device of the transmitting side retransmits data in which an error has occurred to the receiving side in some cases. In this manner, when data is retransmitted, a time until normal data is delivered from the electronic device of the transmitting side to the electrical device of the receiving side is delayed by an extent that retransmission of the data occurs. Compared to low-speed communication methods, in high frequency communication in which large-capacity and high-speed data communication is possible, since a frequency of errors that occur in data to be propagated is high, an influence on communication quality due to connection failure increases.

However, when a general user performs a connection operation between the electronic device and the communication cable, it is difficult to prevent connection failure 100% due to adhesion of din and dust to optical communication terminal end surfaces and mechanical stress.

In view of such problems, methods in which a structure of a connection unit between the electronic device and the communication cable is complicated or fitting accuracy of a connector increases may be exemplified. However, implementation is difficult in the aspects of technology and cost, and it is difficult to ensure reliable transmission.

Therefore, even when connection failure occurs in a part of transmission paths, the communication system 1 according to the present embodiment uses the other transmission paths in which no contact failure has occurred and transmits each piece of data, and thus implements good data transfer.

Specifically, the communication system 1 according to the present embodiment assigns a weight to the plurality of pieces of data serving as transmission targets in advance. In addition, the communication system 1 determines transmission quality of the plurality of transmission paths that connect the electronic devices. Then, the communication system 1 performs control such that data having a higher weight is transmitted through a transmission path having higher transmission quality. In such a configuration, even when sufficient transmission quality is unable to be ensured in a part of transmission paths due to connection failure or the like, the communication system 1 can transmit data through the other transmission paths in which transmission quality can be ensured. Is addition, in this case, since data having a high weight is transmitted in a preferential manner through a transmission path having higher transmission quality, the communication system 1 suppresses a frequency at which retransmission occurs to an extent of the weight of the data and thus is able to perform transmission more reliably. That is, in the communication system 1 according to the present embodiment, it is possible to implement good data transmission even under conditions in which connection failure may occur hi a part of transmission paths.

Now, a configuration and processes of the communication system 1 according to the present embodiment will be described below in detail.

<2. Configuration of Communication System>

Figure 1:
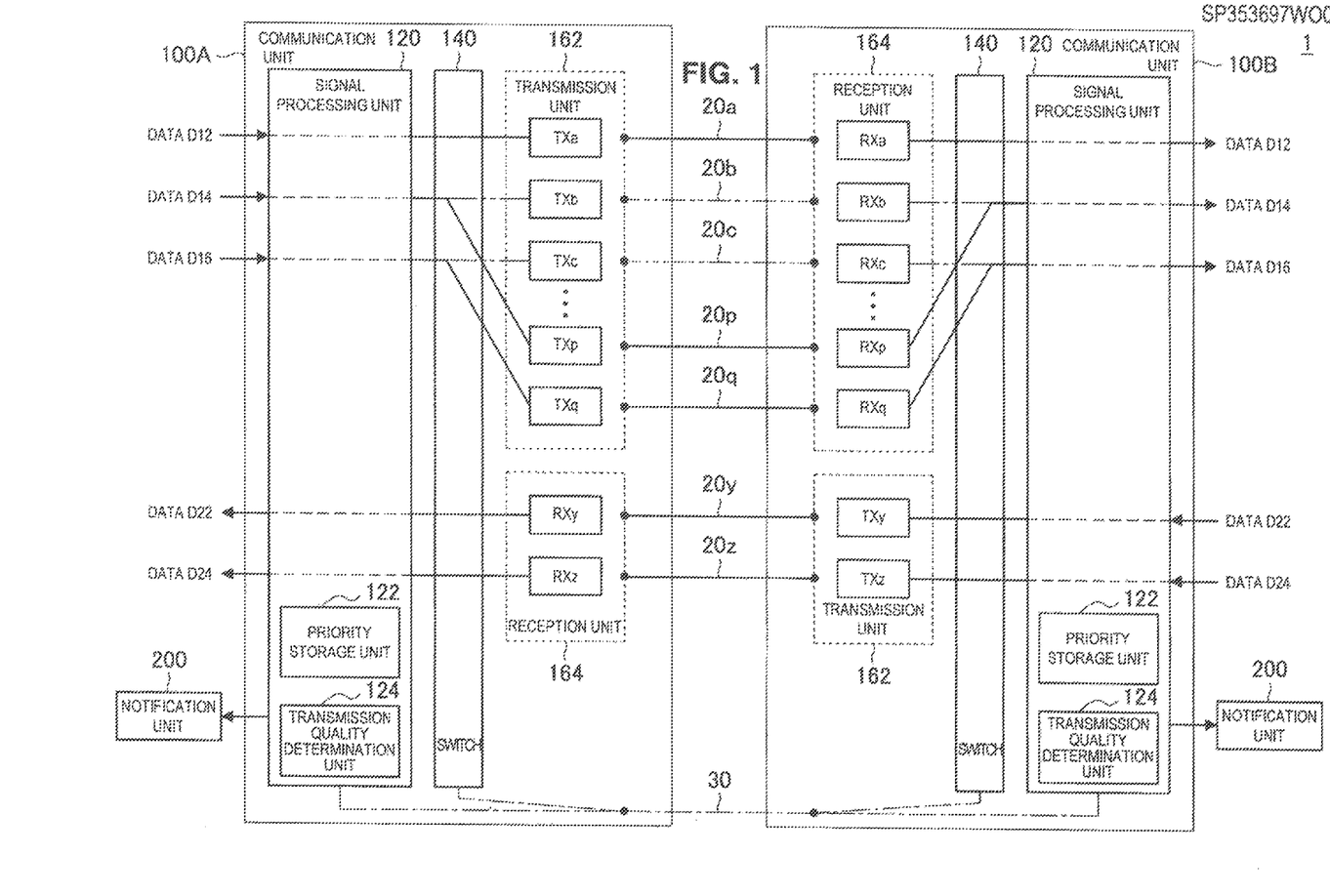
FIG. 1 is a diagram schematically illustrating a configuration of a communication system according to an embodiment of the present disclosure.

A schematic configuration of the communication system 1 according to the present embodiment will be described with reference to FIG. 1. FIG. 1 is a diagram schematically illustrating a configuration of the communication system 1 according to the present embodiment. Also, the configuration of the communication system 1 according to the present embodiment will be separately described below in "2.1. Basic configuration," "2.2. Configuration of transmitting side," and "2.3, Configuration of receiving side."

[2.1. Basic Configuration]

First, the basic configuration of the communication system 1 according to the present embodiment will be described. As illustrated in FIG. 1, the communication system 1 according to the present embodiment includes two different communication units 100A and 100B.

When the communication unit 100A and the communication unit 100B are connected by a plurality of transmission paths 20a to 20z, data is transmitted and received through the transmission paths 20a to 20z. In particular, the communication units 100A and 100B according to the present embodiment may transmit and receive the plurality of pieces of data using serial communication through different transmission paths among the transmission paths $20a$ to $20z$. Hereinafter, when there is no need to particularly distinguish the communication units 100A and 100B, they will be simply referred to as the "communication unit 100" in some cases.

Each of the transmission paths $20a$ to $20z$ is a wire for transmitting data from one of the communication units 100A and 100B to the other. The transmission paths $20a$ to $20z$ may be implemented by, for example, a wired cable such as a copper wire or an optical fiber.

Also, in the communication system 1, one of the communication units 100A and 100B may be operated as a transmission unit configured to transmit data and the other may be operated as a reception unit of data. In addition, as another example, in the communication system 1, the communication units 100A and 100B may each be operated as both the transmission unit and the reception unit. Note that, in the configuration of the communication system 1, the communication units 100A and 100B will each be described below as being operated as both the transmission unit and the reception unit.

The communication unit 100A includes a signal processing unit 120, a switch 140, a transmission unit 162, and a reception unit 164. In addition, similarly to the communication unit 100A, the communication unit 100B includes the signal processing unit 120, the switch 140, the transmission unit 162, and the reception unit 164. Also, the signal processing unit 120 and the switch 140 have different process content according to whether the communication unit 100 is operated as the transmitting side or the receiving side. Therefore, operations of the signal processing unit 120 and the switch 140 will be separately described below in "2.2. Configuration of transmitting side" and "2.3. Configuration of receiving side."

The transmission unit 162 of the communication unit 100A includes a plurality of transmission devices TXa to TXq. On the other hand, the reception unit 164 of the communication unit 100B includes a plurality of receiving devices RXa to RXq. The transmission unit 162 of the communication unit 100A and the reception unit 164 of the communication unit 100B are connected by the transmission paths $20a$ to $20q$. In this case, the transmission device TXa and the receiving device RXa are connected by the transmission path $20a$. Similarly, the transmission devices TXb to TXq and the receiving devices RXb to RXq are connected by the transmission paths $20b$ to $20q$, respectively.

This is similar for the reception unit 164 of the communication unit 100A and the transmission unit 162 of the communication unit 100B. That is, the reception unit 164 of the communication unit 100A includes receiving devices RXy and RXz. On the other hand, the transmission unit 162 of the communication unit 100B includes transmission devices TXy and TXz. The reception unit 164 of the communication unit 100A and the transmission unit 162 of the communication unit 100B are connected by the transmission paths $20y$ and $20z$. In this case, the transmission device TXy and the receiving device RXy are connected by the transmission path $20y$. Similarly, the transmission device TXz and the receiving device RXz are connected by the transmission path $20z$.

Note that, in the following, when there is no need to particularly distinguish the transmission devices TXa to TXz, they will be simply referred to as a "transmission device TX" in some cases. Similarly, when there is no need to particularly distinguish the receiving devices RXa to RXz, they will be simply referred to as a "receiving device RX" in some cases. In addition, when there is no need to particularly distinguish the transmission paths $20a$ to $20z$, they will be simply referred to as a "transmission path 20" in some cases.

The transmission device TX transmits data to the receiving device RX connected by the transmission path 20 through the transmission path 20. In addition, the receiving device RX receives data transmitted from the transmission device TX connected by the transmission path 20.

As a specific example, when the optical fiber is used in the transmission path 20, the transmission device TX includes, for example, a light source and an optical modulator configured to change an intensity of light output from the light source. The light source may be implemented by, for example, a semiconductor laser. In this case, the transmission device TX controls the optical modulator based on an electrical signal (for example, a digital signal) indicating data serving as a transmission target, changes an intensity of light output from the light source and thus converts the electrical signal into an optical signal. Then, the transmission device TX transmits the optical signal to the receiving device RX through the transmission path 20.

In addition, the receiving device RX includes, for example, a photodetector (a light-receiving element). The receiving device RX receives the optical signal transmitted from the transmission device TX through the transmission path 20 using the photodetector, and converts the received optical signal into an electrical signal. As described above, the data transmitted from the transmission device TX is propagated to the receiving device RX through the transmission path 20 and received by the receiving device RX.

However, the above example is only an example. As long as data can be transmitted and received between the transmission device TX and the receiving device RX through the transmission path 20, a medium (for example, an optical signal or an electrical signal) for transmitting and receiving the data and a configuration (for example, an optical fiber or a copper wire) of the transmission path 20 are not particularly limited.

In addition, in the communication system 1 according to the present embodiment, the number of transmission paths 20 may be appropriately selected to correspond to an application field and a use application of the communication system 1, and is preferably greater than or equal to a number of pieces of data (for example, a maximum number) that are transmitted in parallel between the communication units 100 connected to each other.

Also, the transmission path 20 or the transmission device TX and the receiving device RX to which the transmission path 20 is connected may be provided in each of the communication units 100 such that the number of transmission paths 20 exceeds the number of pieces of data transmitted in parallel between the communication units 100. In this manner, when the plurality of transmission paths 20 are provided such that the number of transmission paths 20 exceeds the number of pieces of data transmitted in parallel, a part of the plurality of transmission paths 20 can be used as redundant lines. That is, even when sufficient transmission quality is unable to be ensured in a part of transmission paths 20 among the plurality of transmission paths 20 due to connection failure or the like, the communication system 1 can transmit data using redundant lines as alternatives for the part of the transmission paths 20.

[2.2. Configuration of Transmitting Side]

Next, description will focus particularly on operations of the signal processing unit 120 and the switch 140 among components included in the communication unit 100 when the communication unit 100 is operated as the transmitting side, The signal processing unit 120 causes the transmission unit 162 to transmit the plurality of pieces of data serving as transmission targets to an external device through any transmission path 20 (here, the transmission paths 20a to 20q) used to transmit data to the communication unit 100 of another electronic device serving as the external device among the transmission paths 20a to 20z. Note that the data serving as a transmission target will be described below as "transmission data" in some cases.

The signal processing unit 120 may be implemented by a control unit (for example, a basic processing unit (BPU)) that is embedded in, for example, the communication unit 100, and configured to control operations of components included in the communication unit 100. In addition, as another example, processes of the signal processing unit 120 may be replaced with a control unit (for example, a central processing unit (CPU)) of an electronic device in which the communication unit 100 is embedded. Also, this is similar to a case in which the communication unit 100 is operated as the receiving side.

Note that the signal processing unit 120 according to the present embodiment causes the transmission unit 162 to set priorities among transmission date, and transmit transmission data having a higher priority (in other words, transmission data having a higher weight) to the external device through the transmission path 20 having higher transmission quality. In order to implement such operations, in the communication unit 100 according to the present embodiment, the switch 140 is interposed between the signal processing unit 120 and each of the transmission devices TX constituting the transmission unit 162.

The switch 140 is configured to switch a connection relation between a signal line for the signal processing unit 120 to output each piece of transmission data and each of the transmission devices TX.

In addition, the signal processing unit 120 may include a priority storage unit 122 configured to store order information indicating a priority and cause the priority storage unit 122 to store order information that is created in advance. In this case, the signal processing unit 120 may set a priority among the plurality of pieces of data serving as transmission targets based on the order information stored in the priority storage unit 122 in advance.

Specifically, the signal processing unit 120 compares a priority set for each piece of transmission data with transmission quality of each of the transmission paths 20, and associates transmission data having a higher priority with the transmission path having higher transmission quality 20. The switch 140 switches a connection relation between the signal line for the signal processing unit 120 to output each piece of transmission data and each of the transmission devices TX according to the associations by the signal processing unit 120 between the transmission data and the transmission paths 20.

Accordingly, among a plurality of pieces of transmission data output from signal lines of the signal processing unit 120, transmission data having a higher priority is transmitted to the external device through the transmission path having higher transmission quality 20.

Also, the signal processing unit 120 may cause the transmission unit 162 to transmit each piece of transmission data to the external device through another transmission path 20 without using the transmission path 20 in which transmission quality for transmitting each piece of transmission data may not be sufficiently ensured (that is, when transmission quality is below a threshold) among the plurality of transmission paths 20.

For example, FIG. 1 exemplifies a case in which the transmission path 20a has the highest transmission quality, and the transmission quality of the transmission paths 20p and 20q is next highest among the transmission paths 20a to 20q. In addition, the example illustrated in FIG. 1 shows a case in which transmission quality sufficient for transmitting each piece of transmission dates may not be ensured in the transmission paths 20b and 20c. Here, when data D12, D14, and D16 is transmitted as transmission data, the signal processing unit 120 sets a priority among the pieces of data as data D12>data D14>data D16.

In this case, the signal processing unit 120 avoids using the transmission paths 20b and 20c, and associates transmission data having a higher priority with the transmission path having higher transmission quality 20 among transmission paths 20 other than the transmission paths 20b and 20c.

That is, in the example illustrated in FIG. 1, the signal processing unit 120 associates the data D12 with the transmission path 20a. Similarly, the signal processing unit 120 associates the data D14 with the transmission path 20p, and associates the data D16 with the transmission path 20q. Then, the switch 140 connects a signal line for the signal processing unit 120 to output the data D12 and the transmission device TXa connected to the transmission path 20a according to the associations between the transmission data and the transmission paths 20. Similarly, the switch 140 connects a signal line for the signal processing unit 120 to output the data D14 and the transmission device TXp, and connects a signal line for the signal processing unit 120 to output the data D16 and the transmission device TXq.

Accordingly, among the plurality of pieces of transmission data output from signal lines of the signal processing unit 120, transmission data having a higher priority is transmitted to the external device through the transmission path having higher transmission quality 20.

Also, operations of the signal processing unit 120 and the switch 140 will be separately described below in detail in "3.1. Operation of transmitting side."

In addition, hereinafter, when the signal processing unit 120 transmits data to the external device, it is assumed that the data is transmitted through the transmission unit 162 unless otherwise specified. In addition, hereinafter, a connection relation between the signal line for the signal processing unit 120 to output each piece of transmission data and each of the transmission devices TX will be simply referred to as a "connection relation between the signal processing unit 120 and the transmission unit 162" in some cases. In addition, the signal processing unit 120 when the communication unit 100 is operated as the transmitting side corresponds to an exemplary "transmission processing unit."

[2.3. Configuration of Receiving Side]

Description will focus particularly on operations of the signal processing unit 120 and the switch 140 among components included in the communication unit 100 when the communication unit 100 is operated as the receiving side.

The signal processing unit 120 receives the plurality of pieces of transmission data transmitted through the plurality of transmission paths 20 (here, fee transmission paths 20a to 20q) from the external device (that is, the other communication unit 100) through the reception unit 164. Also, hereinafter, when the signal processing unit 120 receives data transmitted from the external device, it is assumed that the data is received through the reception unit 164 unless otherwise specified.

The switch 140 is interposed between the signal processing unit 120 and each of the receiving devices RX constituting the reception unit 164. The switch 140 switches a connection relation between a signal line for inputting each piece of transmission data to the signal processing unit 120 and each of the receiving devices RX. Also, hereinafter, the connection relation between the signal line for inputting each piece of transmission data to the signal processing unit 120 and each of the receiving devices RX will be simply referred to as a "connection relation between the signal processing unit 120 and the reception unit 164" in some cases. In addition, the signal processing unit 120 when the communication unit 100 is operated as the receiving side corresponds to an exemplary "reception processing unit."

When the communication unit 100 is operated as the receiving side, the signal processing unit 120 includes a transmission quality determination unit 124. The transmission quality determination unit 124 determines transmission quality of the transmission path 20 that is used to transmit the transmission data based on transmission data transmitted through each of the transmission paths 20. Also, a process of the transmission quality determination unit 124 determining transmission quality will be separately described below in detail.

In addition, when it is determined that transmission, quality of the transmission path 20 is not appropriate for transmitting transmission data based on the determination result of transmission quality, the signal processing unit 120 may notify a notification unit 200 of notification information indicating that the transmission path 20 is not appropriate for transmitting transmission data.

The notification unit 200 is configured to notify a user of notification information. The notification unit 200 may be implemented by various devices that are provided in the electronic device in which the communication unit 100 is embedded. As a specific example, the notification unit 200 may be implemented by a device through which image information, character information or the like can be displayed as notification information such as a display. In addition, as another example, the notification unit 200 may be implemented by a device through which sound information can be output as notification information such as a speaker. In addition, as another example, the notification unit 200 may be implemented by a light source such as a light emitting diode (LED). In this case, the notification unit 200 may notify the user of notification information such as a warning by lighting up or blink.

In addition, the notification unit 200 may be a communication device configured to perform communication with the external device (for example, a server) via a network. In this case, the notification unit 200 may notify the external device of notification information. As a specific example, the notification unit 200 may notify a management server configured to perform a maintenance service of the communication unit 100 of, for example, a decrease in transmission quality due to connection failure as notification information. Accordingly, it is possible to build a support system in which notification information a notification of which is issued from the communication unit 100 is analyzed in the management server side, and the user is notified of a handling method for suppressing a decrease of transmission quality based on the analysis result.

Also, it is needless to say that the process when the communication unit 100 is operated as the transmitting side and the process when the communication unit 100 is operated as the receiving side may be appropriately switched according to whether the communication unit 100 is operated as the transmitting side or the receiving side, by the signal processing unit 120 and the switch 140.

In addition, the communication unit 100 may be operated as only one of the transmitting side and the receiving side. When the communication unit 100 is operated as only one of the transmitting side and the receiving side, the communication unit 100 need not necessarily include a configuration of the other side, Also, operations of the signal processing unit 120 and the switch 140 will be separately described below in detail in "3.2. Operation of receiving side."

<3. Operation of Communication System>

Figure 2:
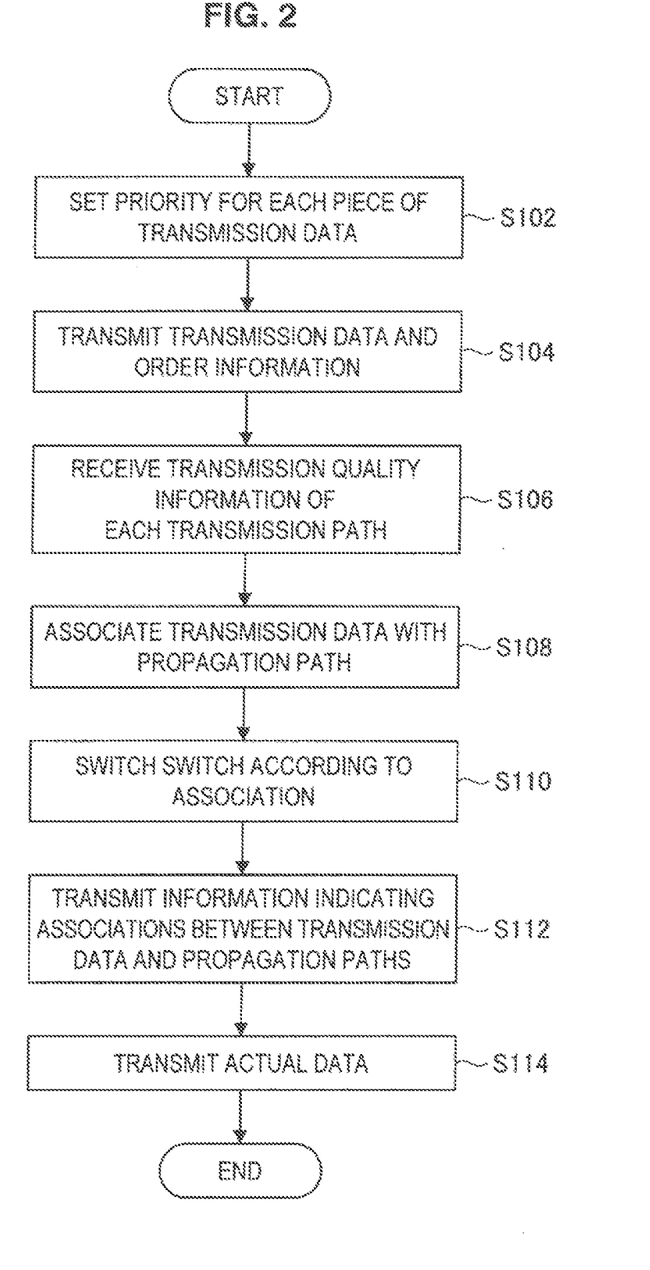
FIG. 2 is a flowchart illustrating an exemplary series of operations of a communication unit of a transmitting side according to the embodiment.
Figure 3:
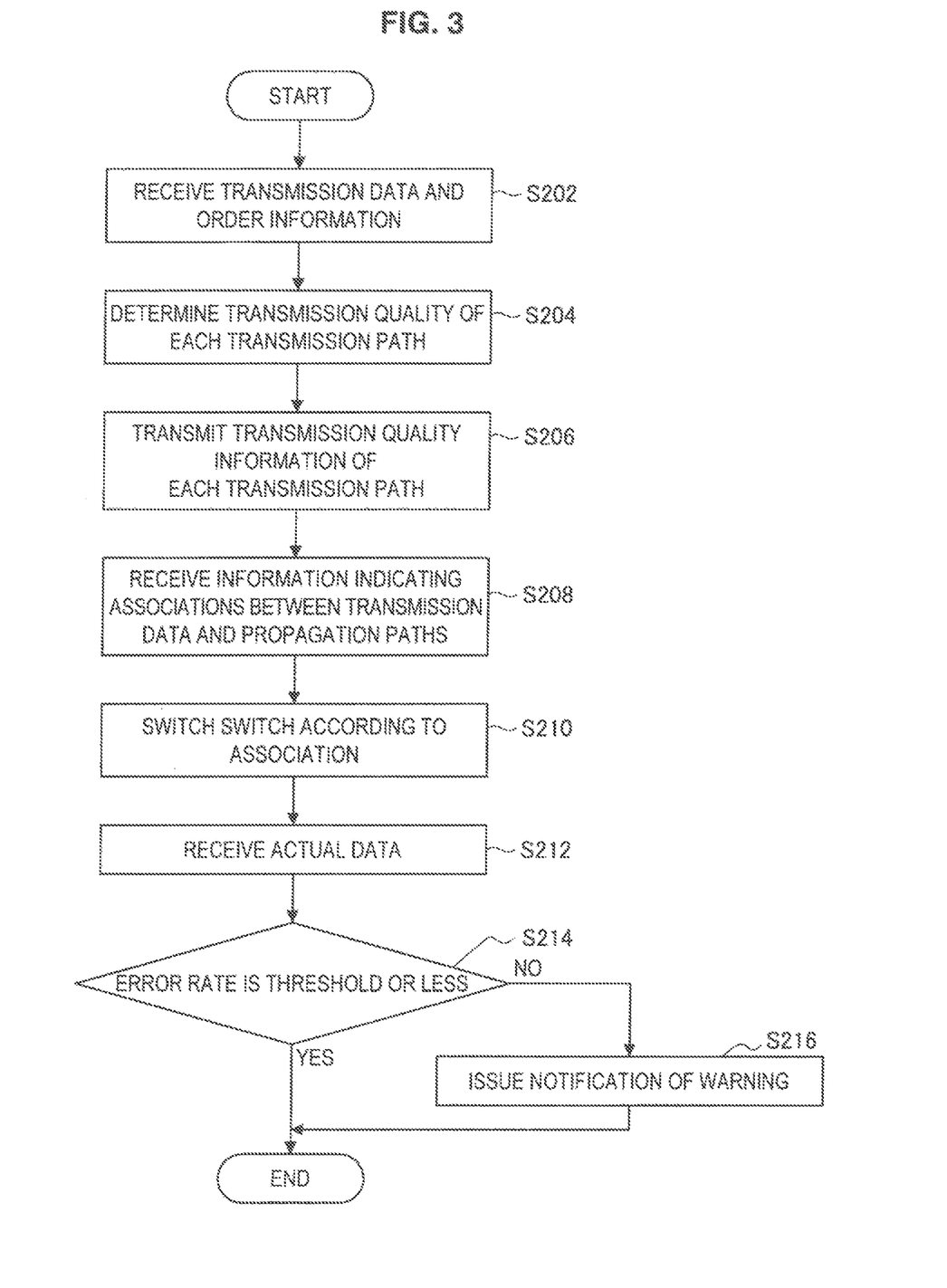
FIG. 3 is a flowchart illustrating an exemplary series of operations of a communication unit of a receiving side according to the embodiment.

Next, flows of series of processes of the communication unit 100 when the communication unit 100 is operated as the transmitting side and when the communication unit 100 is operated as the receiving side will be described separately with reference to FIGS. 2 and 3.

[3.1. Operation of Transmitting Side]

First, a case in which the communication unit 100 is operated as the transmitting side will be described with reference to FIG. 2. FIG. 2 is a flowchart illustrating an exemplary series of operations of the communication unit 100 of the transmitting side according to the present embodiment and illustrates a flow of a series of processes when the communication unit 100 is operated as the transmitting side.

(Step S102: Set Order Information for Each Piece of Transmission Data)

The signal processing unit 120 assigns a weight to a plurality of pieces of transmission data according to predetermined conditions. As a specific example, the signal processing unit 120 may acquire order information indicating a priority among the plurality of pieces of data serving as transmission targets and set a priority (that is, weight) among the plurality of pieces of data based on the order information.

Also, the signal processing unit 120 includes the priority storage unit 122 configured to store order information, and may cause pre-created order information to be stored in the priority storage unit 122. In this case, the signal processing unit 120 may set a priority among the plurality of pieces of date serving as transmission targets based on order information stored in advance is the priority storage unit 122.

In addition, as another example, the signal processing unit 120 may acquire order information from the outside and set a priority among the plurality of pieces of data serving as transmission targets based on the acquired order information. As a specific example, the signal processing unit 120 may set a priority among the plurality of pieces of data based on order information generated in the control unit (for example, the CPU) of the electronic device in which the communication unit 100 is embedded. In addition, the signal processing unit 120 may store the acquired order information in the priority storage unit 122.

Also, the priority among the plurality of pieces of data serving as transmission targets may be set according to predetermined conditions, for example, a type of target data, a use application of the data, and a capacity of the data. As specific example, when image data such as a moving image or a still image and sound data are transmitted based on a streaming method, a real time property is necessary to transmit the data. In addition, the image data and the sound data have a larger capacity than text data and some pieces of control data.

For example, in data for which a real time property is necessary, when it is necessary to retransmit date due to occurrence of a transmission error, there is a possibility of interrupting the real time property due to a delay that is generated by the retransmission. Therefore, an influence according to the retransmission is not small. In addition, in data having a large capacity, when it is necessary to retransmit data due to occurrence of a transmission error, an amount of delay according to the retransmission tends to increase according to a capacity of data. Therefore, data for which a real time property is necessary and data having a larger capacity than other data such as image data and sound data are set to have a higher priority than other data. Also, in the image data and the sound data, a capacity of the image data tends to become larger than a capacity of the sound data. Therefore, a priority of image data may be set to be higher than a priority of sound data.

On the other hand, data for which a real time property is not necessary such as some pieces of control data, and date having a small capacity such as test data are included in data serving as transmission targets in some cases. In such data for which a real time property is not necessary, even when it is necessary to retransmit data due to occurrence of a transmission error, it is not necessary to immediately perform a process based on the data. Therefore, an influence according to the retransmission is small. Similarly, in data having a small capacity, even when it is necessary to retransmit data due to occurrence of a transmission error, an amount of delay according to the retransmission is smaller than that when data having a large capacity such as image data and sound data is retransmitted. Therefore, data for which a real time property is not necessary such as some pieces of control data and text data, and data having a smaller capacity than other data are set to have a lower priority than other data.

Note that setting of a priority (assigning a weight) among data described above is only an example, and the present disclosure is not limited thereto. For example, according to an application field of the communication system 1 according to the present embodiment and a use application of the communication system 1, a priority among data is different in some cases. Therefore, for example, according to the application field of the communication system 1 and the use application of the communication system 1, setting of a priority among data may be appropriately changed.

(Step S104: Transmit Transmission Data and Order Information)

When the priority is set, the signal processing unit 120 transmits the order information and the plurality of pieces of transmission data to the external device (that is, the other communication unit 100) that is connected to the communication unit 100 through the transmission paths 20a to 20z. Then, the signal processing unit 120 instructs the external device to determine transmission quality of the transmission paths 20 (here, the transmission paths 20a to 20q) used to transmit data to the external device among the transmission paths 20a to 20z. Also, in this case, transmission data that is transmitted to the external device by the signal processing unit 120 is used for the external device to determine transmission quality. Therefore, as the transmission data, for example, initial data for transmission quality determination may be stored in a device that can be .read by the signal processing unit 120. Also, the transmission quality is an index indicating communication quality when the transmission path 20 transmits data. As a specific example, an error occurrence rate of the transmission path 20 may be exemplified.

In addition, when the signal processing unit 120 instructs the external device to determine transmission quality, the external device may be notified of a threshold (hereinafter, this may be described as a "threshold of transmission quality for each priority") of allowable transmission quality when transmission data corresponding to the priority is transmitted for each priority indicated by the order information. In such a configuration, when transmission data is transmitted and received with the communication unit 100, the external device can determine whether sufficient transmission quality for transmitting the transmission data can be ensured in each of the transmission paths 20 based on the threshold a notification of which is issued.

(Step S106: Receive Transmission Quality Information of Each Transmission Path)

The signal processing unit 120 acquires the transmission quality information indicating transmission quality of each of the transmission paths 20a to 20q from the external device as a response to an instruction for determining transmission quality. Also, within the signal processing unit 120, a component configured to acquire the transmission, quality information corresponds to an exemplary "order information acquisition unit" in the communication unit 100 of the transmitting side.

Also, the signal processing unit 120 may use any of the transmission paths 20a to 20z as a transmission path for transmitting and receiving the instruction for determining transmission quality and the transmission quality information to and from the external device. In addition, as another example, when a dedicated transmission path 30 separated from the transmission paths 20a to 20z is provided, the signal processing unit 120 may transmit and receive information to and from the external device through the transmission path 30.

In addition, even after the communication unit 100 is activated, the signal processing unit 120 may instruct the external device to determine transmission quality for each predetermined timing. In this case, by transmitting initial data to the external device, the signal processing unit 120 may instruct the external device to determine transmission quality based on the initial data. In addition, as another example, the signal processing unit 120 may instruct the external device to determine transmission quality based on actual data that is transmitted from the communication unit 100 to the external device.

(Step S108: Associate Transmission Data with Propagation Path)

When the transmission quality information is acquired, the signal processing unit 120 performs a process of transmitting a plurality of pieces of transmission data (that is, actual data) serving as transmission targets. Specifically, the signal processing unit 120 acquires the plurality of pieces of transmission data from the outside of the communication unit 100. Also, the plurality of pieces of transmission data are stored in a predetermined storage area, for example, a database (DB). In this case, the signal processing unit 120 acquires the plurality of pieces of transmission data serving as transmission targets from the storage area based on, for example, an instruction of a control unit (for example, CPU) of the electronic device in which the communication unit 100 is embedded.

When the plurality of pieces of transmission data are acquired, the signal processing unit 120 sets a priority of the plurality of pieces of transmission data based on order information. When the priority is set for each piece of transmission data, the signal processing unit 120 compares the priority with the transmission quality information indicating transmission, quality of each of the transmission paths 20a to 20q, and associates each piece of transmission data with any of the transmission paths 20a to 20q.

In this case, the signal processing unit 120 associates, for example, transmission data to which a higher priority is set among the plurality of pieces of transmission data with the transmission path having higher transmission quality 20 among the transmission paths 20a to 20q. As a specific example, the signal processing unit 120 sequentially extracts the plurality of pieces of transmission data in descending order of the priority and associates the extracted transmission data with the transmission path 20 having the highest transmission quality among the transmission paths 20 with which no other transmission data is associated. As described above, the signal processing unit 120 may associate the plurality of pieces of transmission data with the transmission paths 20.

(Step S110: Switch Switch According to Association)

When each piece of transmission data is associated with each of the transmission paths 20, the signal processing unit 120 outputs control information indicating the association to the switch 140 to be described below. The switch 140 switches the connection relation between the signal processing unit 120 and the transmission unit 162 based on the control information acquired from the signal processing unit 120. Accordingly, the signal line for the signal processing unit 120 to output each piece of transmission data and the transmission device TX connected to the transmission path 20 associated with the transmission data are connected according to the association indicated by the control information.

(Step S112: Transmit Information Indicating Associations Between Transmission Data and Propagation Paths)

In addition, the signal processing unit 120 transmits the control information indicating the associations between the transmission data and the transmission paths 20 to the external device. In this case, the signal processing unit 120 may notify the external device of fee control information through any of the transmission paths 20a to 20q, or notify the external device of the control information through the dedicated transmission path 30. Accordingly, the external device can identify whether each piece of transmission data is transmitted through any of the transmission paths 20a to 20q based on the control information acquired from the signal processing unit 120. Also, a component configured to transmit (a notification of) the control information to the external device within the signal processing unit 120 corresponds to an exemplary "notification unit" in the communication unit 100 of the transmitting side.

(Step S114: Transmit Actual Data)

When the control information is transmitted to the external device, the signal processing unit 120 outputs each piece of transmission data to the transmission unit 162 through the switch 140. Accordingly, each piece of transmission data is transmitted to the external device through the transmission path 20 associated with the transmission data.

Also, as long as the switch 140 switches the connection relation between the signal processing unit 120 and the transmission unit 162 based on the control information indicating the associations between the transmission data and the transmission paths 20, a subject controlling switching of the switch 140 is not particularly limited. For example, a control unit (for example, a BPU) provided in the switch 140 may control switching of the switch 140. In addition, as another example, the signal processing unit 120 may control switching of the switch 140. In this case, the signal processing unit 120 does not necessarily output the control information to the switch 140. In addition, as another example, the control unit (for example, the CPU) of the electronic device in which the communication unit 100 is embedded may control switching of the switch 140. In this case, it is needless to say that the signal processing unit 120 outputs the control information to the control unit.

In addition, the communication unit 100 may perform the series of operations described above at, for example, each time the communication cable (that is, each of the transmission paths 20) is inserted or removed or at predetermined timings during communication (while actual data is transmitted and received). Also, in this case, it is needless to say that the communication unit 100 of the receiving side to be described below is also operated. In such a configuration, for example, even when transmission quality of a part of the transmission paths 20 decreases after an operation starts, the communication unit 100 transmits transmission data by performing switching to a transmission path 20 other than the transmission path 20, and is able to maintain good transmission.

Also, when transmission data is transmitted without using a part of the transmission paths 20, the communication unit 100 may determine transmission quality of transmission paths 20 other than the part of transmission paths 20 among the plurality of transmission paths 20 again, and associate each piece of transmission data with any of the other transmission paths 20.

[3.2. Operation of Receiving Side]

Next, a case in which the communication unit 100 is operated as the receiving side will be described with reference to FIG. 3. FIG. 3 is a flowchart illustrating an exemplary series of operations of the communication unit 100 of the transmitting side according to the present embodiment and illustrates a flow of a series of processes when the communication unit 100 is operated as the receiving side.

(Step S202: Receive Transmission Data and Order Information)

When the communication unit 100 is activated (alternatively, when each of the transmission paths 20 is connected to the communication unit 100), the signal processing unit 120 receives order information and a plurality of pieces of transmission data transmitted from the external device through the transmission paths 20a to 20q. Then, the signal processing unit 120 receives the instruction for determining transmission quality of each of the transmission paths 20a to 20q from the external device.

Also, the signal processing unit 120 may acquire a threshold of transmission quality for each priority from the external device. The signal processing unit 120 may store the acquired threshold of transmission quality for each priority in a storage unit that can be read by the signal processing unit 120.

(Step S204: Determine Transmission Quality of Each Transmission Path)

When the Instruction for determining transmission quality is received, the signal processing unit 120 instructs the transmission quality determination unit 124 to determine transmission quality of each of the transmission paths 20a to 20q based on each piece of transmission data received through each of the transmission paths 20a to 20q. When the instruction is received, the transmission quality determination unit 124 determines transmission quality of the transmission path 20 used for transmitting the transmission data based on each piece of received transmission data. As a specific example, the transmission quality determination unit 124 may measure an error rate of the transmission data transmitted through each of the transmission paths 20, and the error rate may be used as an index of transmission quality of the transmission path 20 used for transmitting the transmission data. In this case, the signal processing unit 120 may recognize that, for example, a lower error rate indicates higher transmission quality and a higher error rate indicates lower transmission quality.

Also, as a specific example of a method of measuring an error rate, a measurement method based on a parity bit is exemplified. Specifically, when a parity bit for performing error detection in transmission data is set, it is possible to determine whether an error is Included in a bit indicating actual data based on comparison between a bit (that is, a bit indicating actual data) other than the parity bit and the parity bit. Also, the measurement method of the error rate based on the parity hit is only an example. As long as the transmission quality determination unit 124 can measure the error rate of the transmission date based on the received transmission data, a method thereof is not limited.

(Step S206: Transmit Transmission Quality Information of Each Transmission Path)

Based on the determination result of transmission quality of each of the transmission paths 20a to 20q by the transmission quality determination unit 124, the signal processing unit 120 transmits the transmission quality information indicating the determination result to the external device that is instructed to determine the transmission quality. Also, a component configured to transmit (a notification of) the transmission quality information to the external device within the signal processing unit 120 corresponds to an exemplary "notification unit" in the communication unit 100 of the receiving side.

Also, the signal processing unit 120 may use any of the transmission paths 20a to 20z as a propagation route for transmitting and receiving the instruction for determining transmission quality and the transmission quality information to and from the external device. In addition, as another example, the signal processing unit 120 may transmit and receive information to and from the external device through the dedicated transmission path 30 provided separately from the transmission paths 20a to 20z.

(Step S208: Receive Information Indicating Associations between Transmission Data and Propagation Paths)

In addition, the signal processing unit 120 receives the control information indicating the associations between the transmission data and the transmission paths 20 from the external device.

(Step S210: Switch Switch According to Association)

When the control information is received from the external device, the signal processing unit 120 outputs the control information to the switch 140. The switch 140 switches the connection relation between the signal processing unit 120 and the reception unit 164 based on the control information acquired from the signal processing unit 120. Accordingly, the signal line for inputting each piece of transmission data to the signal processing unit 120 and the receiving device RX connected to the transmission path 20 associated with the transmission data are connected according to the association indicated by the control information.

(Step S212: Receive Actual Data)

When the switch 140 is switched based on the control information, the signal processing unit 120 acquires transmission data (that is, actual data) transmitted through each of the transmission paths 20 from the reception unit 164 through the switch 140. Accordingly, the signal processing unit 120 can identify and receive each piece of transmission data that is transmitted through each of the transmission paths 20 and associated with the transmission path 20.

(Step S214: Is Error Rate Threshold or Less)

Also, when a threshold of transmission quality for each priority is acquired, the signal processing unit 120 may determine whether each of the transmission paths 20 is appropriate for transmitting transmission data by comparing the determination result of transmission quality based on transmission data transmitted through each of the transmission paths 20 with the threshold. In addition, the signal processing unit 120 may use the determination result of transmission quality based on initial data in comparing with the threshold of transmission quality for each priority. In addition, after transmission of actual data starts, the signal processing unit 120 may determine whether each of the transmission paths 20 is appropriate for transmitting transmission data by comparing the determination result of transmission quality based on the actual data with the threshold of transmission quality for each priority.

For example, when transmission quality of each of the transmission paths 20 is below a threshold (hereinafter, this may be described as a "threshold corresponding to transmission data") corresponding to the priority of transmission data transmitted through the transmission path 20, the signal processing unit 120 may determine that the transmission path 20 is not appropriate for transmitting transmission data. Specifically, when an error rate of transmission data transmitted through each of the transmission paths 20 exceeds a threshold corresponding to the priority of transmission data transmitted through the transmission path 20, the signal processing unit 120 may determine that the transmission path 20 is not appropriate for transmitting transmission data.

(Step S216: Notification of Warning)

When it is determined that at least a part of the transmission paths 20 is not appropriate for transmitting transmission data (No in Step S214), the signal processing unit 120 may cause the notification unit 200 to issue a notification of notification information indicating that the transmission path 20 is not appropriate for transmitting transmission data. Also, the signal processing unit 120 notifies the user of occurrence of contact failure between the communication unit 100 and each of the transmission paths 20 by the notification information, and may encourage the user to clean a connection end surface between the communication unit 100 and each of the transmission paths 20.

In addition, as another example, when the number of transmission paths 20 whose transmission quality is below a threshold corresponding to transmission data among the plurality of transmission paths 20 exceeds a predetermined number, the signal processing unit 120 may cause the notification unit 200 to issue a notification of notification information.

In addition, the signal processing unit 120 may determine whether the transmission path 20 is appropriate for transmitting transmission data by calculating a transmission rate of the each of transmission paths 20 and comparing the calculated transmission rate with a transmission rate (hereinafter, this may be described as a "transmission rate corresponding to transmission data") necessary for transmitting transmission data transmitted through the transmission path 20. In this case, when the transmission rate of the transmission path 20 is below a transmission rate corresponding to transmission data, the signal processing unit 120 decides that the transmission path 20 is not appropriate for transmitting transmission data, and may cause the notification unit 200 to issue a notification of notification information. Also, for example, similarly to the threshold corresponding to transmission data, the transmission rate corresponding to transmission data is set for each priority of the transmission data, and the communication unit 100 of the receiving side may be notified thereof by the communication unit 100 of the transmitting side.

Note that an example in which the signal processing unit 120 of the receiving side instructs the transmission quality determination unit 124 to determine transmission quality based on the instruction of the signal processing unit 120 of the transmitting side has been described above. However, the signal processing unit 120 of the receiving side may independently perform a process of determining transmission quality. As a specific example, when transmission data for transmission quality determination or actual data that can be used to determine transmission quality is received, the signal processing unit 120 of the receiving side may instruct the transmission quality determination unit 124 to determine transmission quality and notify the external device (that is, the communication unit 100 of the transmitting side) of the result thereof.

In addition, an example in which transmission quality is determined based on the error rate has been described above. However, as long as transmission quality of the transmission path 20 can be determined, a method thereof is not limited to the method based on the error rate described above. For example, the transmission quality determination unit 124 may determine transmission quality based on an output (for example, an intensity of light (an amount of light) in optical communication) of a signal propagated through the transmission path 20. In this case, for example, the transmission quality determination unit 124 may determine that the transmission path 20 having a higher signal output indicates higher transmission quality, and when the signal output is below a threshold, sufficient transmission quality for propagating information is unable to be ensured in the corresponding transmission path 20.

<4. Modification of Communication System>

Here, a modification of the communication system 1 according to the present embodiment will be described. As described above, the communication system 1 according to the present embodiment switches, by the switch 140, a connection relation between a signal line for the signal processing unit 120 to input and output transmission data and the transmission devices TX constituting the transmission unit 162 and the receiving devices RX constituting the reception unit 164. Therefore, in the communication system 1 according to the present embodiment, as long as the transmission device TX and the receiving device RX correspond to each other and are connected through the transmission path 20, a physical layout of physical pins (in other words, signal lines connected to the transmission device TX and the receiving device RX) to which the transmission paths 20 are connected is not limited.

In such a configuration, the communication system 1 according to the present embodiment can alleviate limitations on an orientation of a connector configured to connect each of the communication units 100 and the communication cable, for example, when the communication cable (that is, each of the transmission paths 20) is connected to each of the communication units 100.

Figure 4:
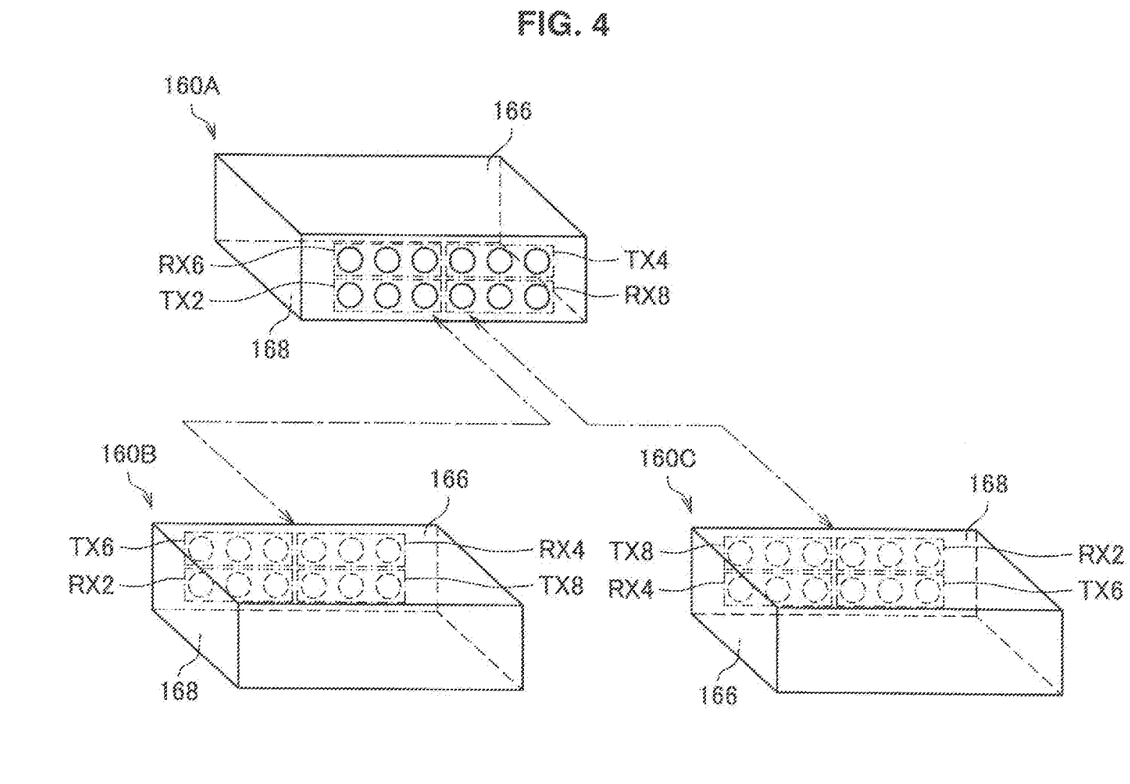
FIG. 4 is a diagram for describing a modification of a communication system according to the embodiment.

For example, FIG. 4 is a diagram for describing a modification of the communication system 1 according to the present embodiment and is a diagram schematically illustrating an exemplary connector that connects the communication unit 100 and the communication cable (each of the transmission paths 20).

In FIG. 4, reference numeral 160A indicates, for example, a connector of the communication unit 100A side for connecting the communication cable to the communication unit 100A in FIG. 1 in a simulated manner. In addition, reference numerals TX2 and TX4 indicate physical pins connected to the transmission devices TX of the communication unit 100A in a simulated manner. Similarly, reference numerals RX6 and RX8 indicate physical pins connected to the receiving devices RX of the communication unit 100A in a simulated manner.

In addition, reference numerals 160B and 160C indicate connectors of the communication cable side. Reference numerals RX2 and RX4 indicate physical pins for connecting the transmission path 20 connected to the receiving devices RX of the communication unit 100B to the communication unit 100A in FIG. 1 in a simulated manner. Similarly, reference numerals TX2 and TX4 indicate physical pins for connecting the transmission path 20 connected to the transmission devices TX of the communication unit 100B to the communication unit 100A in a simulated manner.

In addition, reference numeral 166 indicates one surface of the connectors 160A to 360C (referred to here as a "top surface"), and reference numeral 168 indicates a surface (referred to here as a "bottom surface") opposite to the one surface.

That is, in the examples illustrated in FIG. 4, the connector 160B illustrates an example in which both connectors of the communication unit 100A and the communication cable are connected such that a top surface 166 of a connector of the communication unit 100A side and a top surface 166 of a connector of the communication cable side face the same direction. Similarly, the connector 160B illustrates an example in which both connectors of the communication unit 100A and the communication cable are connected such that a top surface 166 of a connector of the communication unit 100A side and a bottom surface 168 of a connector of the communication cable side face the same direction.

For example, when the connector 160A and the connector 160B are connected, the physical pin TX2 and the physical pin RX2 are connected. Similarly, the physical pin TX4 and the physical pin RX4, the physical pin RX6 and the physical pin TX6, and the physical pin RX8 and the physical pin TX8 are connected.

On the other hand, when the connector 160A and the connector 160C are connected, the physical pin TX2 and the physical pin RX4 are connected. Similarly, the physical pin TX4 and the physical pin RX2, the physical pin RX6 and the physical pin TX8, and the physical pin RX8 and the physical pin TX6 are connected.

In this manner, even in a configuration in which the connector can be reversely connected, the communication system 1 according to the present embodiment can maintain a constant connection relation between the signal processing units 120 of both of the communication units 100A and 100B by switching of the switch 140.

For example, it is assumed that the data D12 transmitted from the signal processing unit 120 of the communication unit 100A is received in the signal processing unit 120 of the communication unit 100B. Also, for simple description, it will be described that the communication unit 100A controls the switch 140 such that the data D12 is always transmitted from the transmission device TX connected to the physical pin TX2.

When the connector 160A and the connector 160B are connected, the data D12 transmitted from the communication unit 100A is transmitted to 100B through the transmission path 20 (here, the transmission path 20*a*) connected to the physical pin RX2. Therefore, the communication unit 100B controls the switch 140 such that a signal line for inputting the data D12 to the signal processing unit 120 and the receiving device RX connected to the transmission path 20a are connected.

On the other hand, when the connector 160A and the connector 160C are connected, the data D12 transmitted from the communication unit 100A is transmitted to 100B through the transmission path 20 (here, the transmission path 20b) connected to the physical pin RX4. Therefore, the communication unit 100B controls the switch 140 such that a signal line for inputting the data D12 to the signal processing unit 120 and the receiving device RX connected to the transmission path 20b are connected.

In this manner, in the communication system 1 according to the present embodiment, even in a configuration in which the connector has an orientation (for example, up and down) that can be freely connected forward and backward, it is possible to maintain a constant connection relation between the signal processing units 120 of both of the communication units 100A and 100B. Therefore, in the communication system 1 according to the present embodiment as long as the transmission device TX and the receiving device RX correspond to each other and are connected through the transmission path 20, a physical layout of physical pins (in other words, signal lines connected to the transmission device TX and the receiving device RX) to which the transmission paths 20 are connected is not limited.

Note that, in the examples illustrated in FIG. 4, a case in which both of the communication units 100A and 100B include both the transmission unit 162 and the reception unit 164 has been described. However, it is needless to say that this is similar to a configuration in which any one includes only the transmission unit 162 and the other includes only the reception unit 164.

Note that the series of operations described above can be implemented by a program causing a control unit (for example, BPU) to control operations of components included in the communication unit 100. Also, as long as a device in which a component configured to perform the above-described process is included is readable, a storage location of the program is not limited. For example, the program may be stored is a recording medium that is connected from the outside of the device. In this case, it may be configured such that, when the recording medium in which the program is stored is connected to the device, the control unit of the communication unit 100 executes the program.

<5. Summary>

As described above, the communication system 1 according to the present embodiment sets priorities among the plurality of pieces of transmission data in advance. In addition, the communication system 1 determines transmission quality of the plurality of transmission paths 20 that connect the electronic devices. Then, the communication system 1 performs control such that transmission data having a higher priority is transmitted through a transmission path having higher transmission quality 20. In such a configuration, even when sufficient transmission quality is unable to be ensured in a part of the transmission paths 20 due to connection failure or the like, the communication system 1 according to the present embodiment can transmit data through the other transmission path 20 in which transmission quality can be ensured. In addition, in this case, since data having a high weight is transmitted in a preferential manner through a transmission path having higher transmission quality, the communication system 1 suppresses a frequency at which retransmission occurs to an extent of the weight of the data and thus is able to perform transmission more reliably.

That is, in the communication system 1 according to the present embodiment, it is possible to implement good data transmission even under conditions in which connection failure may occur in a part of transmission paths. Therefore, in the communication system 1 according to the present embodiment, even when high frequency communication having a large influence on communication quality due to connection failure is applied to consumer devices by a general user performing a connection operation, it is possible to implement good data transmission.

In addition, in the communication system 1 according to the present embodiment, the transmission path 20 or the transmission device TX and the receiving device RX to which the transmission path 20 is connected may be provided in each of the communication units 100 such that the number of transmission paths 20 exceeds the number of pieces of transmission data transmitted in parallel between the communication units 100. In this manner, when the plurality of transmission paths 20 are provided such that the number of transmission paths 20 exceeds the number of pieces of transmission data transmitted in parallel, a part of the plurality of transmission paths 20 can be used as redundant lines. That is, even when sufficient transmission quality is unable to be ensured in a part of transmission paths 20 among the plurality of transmission paths 20 due to connection failure or the like, the communication system 1 can transmit transmission data using redundant lines as alternatives for the part of the transmission paths 20.

In addition, the communication system 1 may perform determination of each transmission quality and a process of associating transmission data and the transmission path 20 based on the determination result, for example, each time the communication cable (that is, each of the transmission paths 20) is inserted or removed or at predetermined timings during communication. In such a configuration, for example, even when transmission quality of a part of the transmission paths 20 decreases after an operation starts, the communication unit 100 transmits transmission data by performing switching to a transmission path 20 other than the transmission path 20, and is able to maintain good transmission.

In addition, when it is determined that transmission quality of each of the transmission paths 20 is not appropriate for transmitting transmission data based on the transmission quality information, the communication system 1 causes the notification unit 200 to issue a notification of notification information. That is, when an abnormality such as connection failure occurs in the transmission path 20, the communication system 1 can notify the user of, for example, a warning indicating that the abnormality has occurred and a handling method for addressing the abnormality through notification information.

In addition, in the communication system 1 according to the present embodiment, the communication unit 100 of the receiving side switches a connection relation between the signal processing unit 120 and the transmission unit 164 based on the control information indicating the associations between the transmission data and the transmission paths 20 a notification of which is issued from the communication unit 100 of the transmitting side. In such a configuration, even when the communication system 1 avoids using a part of the transmission paths 20 according to, for example, a decrease in transmission quality and uses another transmission path 20, it is possible to maintain a connection relation between the communication unit 100 of the transmitting side and the communication unit 100 of the receiving side. Therefore, without changing an interface (a connection relation) between the electronic device to which the communication unit 100 is connected and the communication unit 100, it is possible to embed the communication unit 100 according to the present embodiment in the electronic device.

The preferred embodiments) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of fee effects based on the present specification.

Additionally, the present technology may also be configured as below.

(1)
A transmitter including:
a transmission processing unit configured to associate each of a plurality of pieces of data with any transmission path among a plurality of transmission paths and cause a transmission unit to transmit the data to an external device through the transmission path;
a transmission quality information acquisition unit configured to acquire transmission quality information indicating transmission quality of each of the plurality of transmission paths; and
a switch configured to switch a connection relation between the transmission processing unit and the plurality of transmission paths based on order information indicating a weight among the plurality of pieces of data and the acquired transmission quality information.

(2)
The transmitter according to (1),
wherein the switch switches the connection relation such that data having a high weight is transmitted through a transmission path having high transmission quality.

(3)
The transmitter according to (2),
wherein data having a higher weight among the plurality of pieces of data is associated with a transmission path having higher transmission quality among the plurality of transmission paths.

(4)
The transmitter according to any one of (1) to (3),
wherein the weight is order information indicating a priority of the plurality of pieces of data.

(5)
The transmitter according to any one of (1) to (4),
wherein, when the transmission quality of at least a part of transmission paths among the plurality of transmission paths is below a threshold, the switch switches the connection relation such that the plurality of pieces of data are transmitted through a transmission path other than the part of transmission paths.

(6)
The transmitter according to (5),
wherein the number of the plurality of transmission paths is greater than the number of the plurality of pieces of data.

(7)
The transmitter according to (5) or (6),
wherein, when the transmission quality of the part of transmission paths is below a threshold, the switch switches the connection relation based on transmission quality information of the other transmission path.

(8)
The transmitter according to any one of (1) to (6), including:
a notification unit configured to notify the external device of control information indicating associations between the plurality of pieces of data and the plurality of transmission paths.

(9)
The transmitter according to any one of 81) to (8), including:
an order information acquisition unit configured to acquire the order information,
wherein the plurality of pieces of data are associated with the plurality of transmission paths based on the acquired order information.

(10)
The transmitter according to any one of (1) to (9), including:
a storage unit configured to store the order information,
wherein the plurality of pieces of data are associated with the plurality of transmission paths based on the order information stored in the storage unit (11)
A receiver including:
a reception processing unit configured to receive a plurality of pieces of data from an external device through a plurality of transmission paths;
a transmission quality determination unit configured to determine transmission quality of the transmission path based on the data received through the transmission path for each of the plurality of transmission paths; and
a notification unit configured to notify the external device of a determination result of the transmission quality of each of the plurality of transmission paths in order for the external device to associate the plurality of pieces of data with the plurality of transmission paths.

(12)
The receiver according to (11), including:
a control information acquisition unit configured to acquire control information indicating associations between the plurality of pieces of data and the plurality of transmission paths from the external device; and
a switch configured to switch a connection relation between the reception processing unit and the plurality of transmission paths based on the acquired control information.

(13)
The receiver according to (11) or (12),
wherein the transmission quality determination unit measures an error rate of the data received through the transmission path and determines the transmission quality based on a result of the measurement for each of the plurality of transmission paths.

(14)
The receiver according to any one of (11) to (13), including:
a notification unit configured to issue a notification of notification information when the transmission quality of at least a part of the plurality of transmission paths is below the transmission quality that is necessary to transmit the plurality of pieces of data.

(15)

The receiver according to (14),
wherein the notification unit issues a notification of the notification information when the number of transmission paths whose transmission quality is below a threshold among the plurality of transmission paths exceeds a predetermined number.

(16)

The receiver according to any one of (11) to (13), including:
a notification unit configured to issue a notification of notification information when a transmission rate of at least a part of the plurality of transmission paths is below a transmission rate that is necessary to transmit the plurality of pieces of data.

(17)

A transmission method including:
causing a processor to associate each of a plurality of pieces of data with any transmission path among a plurality of transmission paths, and causing a transmission unit to transmit the data to an external device through the transmission path;
acquiring transmission quality information indicating transmission quality of each of the plurality of transmission paths; arid
causing a switch to switch a connection relation between the processor and the plurality of transmission paths based on order information indicating a weight among the plurality of pieces of data and the acquired transmission quality information.

(18)

A receiving method including:
receiving a plurality of pieces of data from an external device through a plurality of transmission paths;
causing a processor to determine transmission quality of the transmission path based on the data received through the transmission path for each of the plurality of transmission paths; and
notifying the external device of a determination result of the transmission quality of each of the plurality of transmission paths in order for the external device to
associate the plurality of pieces of data with the plurality of transmission paths.

REFERENCE SIGNS LIST 1 communication system
20, 20a to 20z transmission path
30 transmission path
100, 100A, 100B communication unit
120 signal processing unit
122 priority storage unit
124 transmission quality determination unit
140 switch
162 transmission unit
164 reception unit
200 notification unit

The invention claimed is:

1. A transmitter, comprising:
a processor and a memory that stores instructions for execution by the processor, wherein the processor is configured to:
associate each of a plurality of pieces of data with a corresponding transmission path of a plurality of transmission paths and control transmission of the plurality of pieces of data to an external device via the plurality of transmission paths;
acquire transmission quality information that indicates transmission quality of each of the plurality of transmission paths; and
switch a connection relation between the processor and the plurality of transmission paths based on order information that comprises a weight of each of the plurality of pieces of data and the transmission quality information,
wherein the weight of each of the plurality of pieces of data is calculated based on a use application of the plurality of pieces of data.

2. The transmitter according to claim 1, wherein the processor is further configured to switch the connection relation such that, a first piece of data that has a high weight is transmitted via a first transmission path that has a high transmission quality.

3. The transmitter according to claim 2, wherein a second piece of data that has a higher weight among the plurality of pieces of data is associated with a second transmission path that has a higher transmission quality among the plurality of transmission paths.

4. The transmitter according to claim 1, wherein the weight indicates a priority order of the plurality of pieces of data.

5. The transmitter according to claim 1, wherein, based on a determination that the transmission quality of at least a part of transmission paths among the plurality of transmission paths is below a threshold, the processor is further configured to switch the connection relation such that, the plurality of pieces of data are transmitted via a subset of transmission paths, of the plurality of transmission paths, other than the part of transmission paths.

6. The transmitter according to claim 5, wherein a number of the plurality of transmission paths is greater than a number of the plurality of pieces of data.

7. The transmitter according to claim 5, wherein based on the determination that the transmission quality of the part of transmission paths is below the threshold, the processor is further configured to switch the connection relation based on the transmission quality information of the subset of transmission paths.

8. The transmitter according to claim 1, wherein the processor is further configured to notify the external device of control information that indicates associations between the plurality of pieces of data and the plurality of transmission paths.

9. The transmitter according to claim 1, wherein the processor is further configured to acquire the order information, wherein the plurality of pieces of data are associated with the plurality of transmission paths based on the order information.

10. The transmitter according to claim 1, wherein the memory is further configured to store the order information, wherein the plurality of pieces of data are associated with the plurality of transmission paths based on the order information stored in the memory.

11. A receiver, comprising:
a processor and a memory that stores instructions for execution by the processor, wherein the processor is configured to:
receive a plurality of pieces of data from an external device via a plurality of transmission paths;
determine transmission quality of each of the plurality of transmission paths based on the plurality of pieces of data received via the plurality of transmission paths; and notify the external device the transmission quality of each of the plurality of transmission paths, wherein the external device associates the plurality of pieces of data with the plurality of transmission paths based on the transmission quality and a weight of each of the plurality of pieces of data, wherein the weight of each of the plurality of pieces of data is calculated based on a use application of the plurality of pieces of data.

12. The receiver according to claim 11, wherein the processor is further configured to:

acquire control information that indicates associations between the plurality of pieces of data and the plurality of transmission paths from the external device; and switch a connection relation between a plurality of reception devices and the plurality of transmission paths based on the control information.

13. The receiver according to claim 11, wherein the processor is further configured to measure an error rate of the plurality of pieces of data received via the plurality of transmission paths and determine the transmission quality of each of the plurality of transmission paths based on the measurement of the error rate of the plurality of pieces of data for each of the plurality of transmission paths.

14. The receiver according to claim 11, wherein the processor is further configured to issue a notification of notification information based on the transmission quality of at least a part of the plurality of transmission paths that is below a required transmission quality necessary to transmit the plurality of pieces of data.

15. The receiver according to claim 14, wherein the processor is further configured to issue a notification of the notification information based on a number of transmission paths whose transmission quality is below a threshold exceeds a determined number.

16. The receiver according to claim 11, wherein the processor is further configured to issue a notification of notification information based on a transmission rate of at least a part of the plurality of transmission paths is below a required transmission rate necessary to transmit the plurality of pieces of data.

17. A transmission method, comprising:

in a transmitter comprising a processor and a memory:

associating each of a plurality of pieces of data with a corresponding transmission path among a plurality of transmission paths, and controlling transmission of the plurality of pieces of data to an external device via the plurality of transmission paths;

acquiring transmission quality information indicating transmission quality of each of the plurality of transmission paths; and switching a connection relation between the processor and the plurality of transmission paths based on order information comprising a weight of each of the plurality of pieces of data and the transmission quality information, wherein the weight of each of the plurality of pieces of data is calculated based on a use application of the plurality of pieces of data.

18. A receiving method, comprising:

in a receiver comprising a processor and a memory:

receiving a plurality of pieces of data from an external device via a plurality of transmission paths;

determining transmission quality of each of the plurality of transmission paths based on the plurality of pieces of data received via the plurality of transmission paths; and notifying the external device the transmission quality of each of the plurality of transmission paths, wherein the external device associates the plurality of pieces of data with the plurality of transmission paths based on the transmission quality and a weight of each of the plurality of pieces of data, wherein the weight of each of the plurality of pieces of data is calculated based on a use application of the plurality of pieces of data.

* * * * *